US010753250B2

(12) United States Patent
Hedevang

(10) Patent No.: US 10,753,250 B2
(45) Date of Patent: Aug. 25, 2020

(54) UNIVERSAL SHUTOFF VALVE

(71) Applicant: KAUTEX TEXTRON GMBH & CO., KG, Bonn (DE)

(72) Inventor: Poul Hedevang, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/910,777

(22) PCT Filed: Jul. 22, 2014

(86) PCT No.: PCT/EP2014/065720
§ 371 (c)(1),
(2) Date: Feb. 8, 2016

(87) PCT Pub. No.: WO2015/018634
PCT Pub. Date: Feb. 12, 2015

(65) Prior Publication Data
US 2016/0201819 A1     Jul. 14, 2016

(30) Foreign Application Priority Data

Aug. 9, 2013   (DE) .................. 10 2013 013 212

(51) Int. Cl.
*F16K 24/04*     (2006.01)
*F01N 3/20*     (2006.01)
*F01N 3/28*     (2006.01)

(52) U.S. Cl.
CPC ......... *F01N 3/2066* (2013.01); *F01N 3/2896* (2013.01); *F16K 24/044* (2013.01);
(Continued)

(58) Field of Classification Search
CPC ......... Y10T 137/0874; Y10T 137/3099; Y10T 2015/03289; Y10T 137/86324;
(Continued)

(56) References Cited

U.S. PATENT DOCUMENTS 3,500,843 A *   3/1970   White ............. B60K 15/03519
                                                        137/43
3,548,847 A * 12/1970   Roven ............ B60K 15/03504
                                                        137/202
(Continued)

FOREIGN PATENT DOCUMENTS

CN         101457683        6/2009
JP         2000-352364     12/2000
(Continued)

OTHER PUBLICATIONS

English language PCT International Search Report and Written Opinion dated Nov. 14, 2014, received in corresponding PCT Application No. PCT/EP14/65720, 10 pgs.
(Continued)

*Primary Examiner* — Craig J Price
(74) *Attorney, Agent, or Firm* — Grossman, Tucker, Perreault & Pfleger, PLLC

(57) ABSTRACT

An improved venting and/or air admission valve for an operating fluid reservoir, wherein different shutoff levels (SOH) can be achieved. The venting and/or air admission valve is distinguished by the fact that it comprises an adapter, which can be fastened on an operating fluid reservoir wall, and that a valve housing of the venting and/or air admission valve can be fastened on the adapter in such a way that the adapter is arranged between the operating fluid reservoir wall and the valve housing.

20 Claims, 5 Drawing Sheets

Figure 1A:
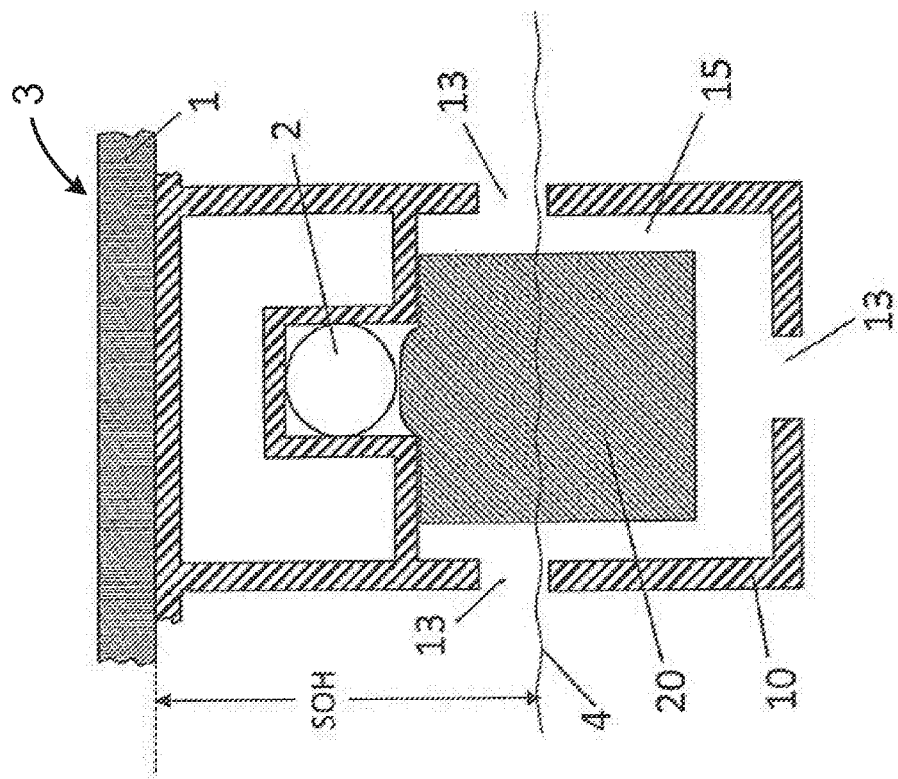

(52) U.S. Cl.
CPC .. *F01N 2450/18* (2013.01); *F01N 2610/1466* (2013.01); *Y02A 50/2325* (2018.01); *Y02T 10/24* (2013.01)

(58) Field of Classification Search
CPC ............ B60K 15/035; B60K 15/03504; B60K 15/03519; B60K 15/03289; B60K 2015/03289; B60K 15/03177; F16L 47/02; F16L 47/14; F02M 37/017; F02M 37/0076; F16K 24/04; F16K 24/06; F16K 27/07; F16K 24/044; F01N 3/2066; F01N 3/2896; F01N 2450/18; F01N 2610/1466; Y02A 50/2325; Y02T 10/24
USPC ........... 137/43, 202; 285/921; 123/516, 518, 123/198 D, 520
See application file for complete search history.

(56) References Cited

U.S. PATENT DOCUMENTS

| | | | | |
|---|---|---|---|---|
| 3,610,263 | A * | 10/1971 | Walters | F16K 17/366 137/43 |
| 3,910,302 | A * | 10/1975 | Sudhir | B60K 15/03519 137/43 |
| 4,989,629 | A * | 2/1991 | Shirakawa | B60K 15/03519 137/202 |
| 5,139,043 | A * | 8/1992 | Hyde | B60K 15/03519 137/375 |
| 5,277,217 | A * | 1/1994 | Kobayashi | B60K 15/03519 137/202 |
| 5,404,907 | A * | 4/1995 | Benjey | B60K 15/03519 137/202 |
| 5,687,756 | A * | 11/1997 | Vannatta | B60K 15/03519 137/202 |
| 5,694,968 | A * | 12/1997 | Devall | B60K 15/03519 137/202 |
| 5,954,083 | A * | 9/1999 | Hattori | B60K 15/03519 137/202 |
| 5,960,816 | A | 10/1999 | Mills et al. | |
| 5,960,819 | A * | 10/1999 | Weissinger | B60K 15/03519 137/315.11 |
| 5,992,441 | A * | 11/1999 | Enge | B60K 15/03519 137/202 |
| 5,996,607 | A | 12/1999 | Bergsma et al. | |
| 6,058,963 | A | 5/2000 | Enge et al. | |
| 6,062,250 | A * | 5/2000 | Takahashi | B60K 15/03519 137/202 |
| 6,158,456 | A | 12/2000 | Enge | |
| 6,170,510 | B1 * | 1/2001 | King | B60K 15/03519 137/202 |
| 6,425,379 | B2 * | 7/2002 | Shimamura | B60K 15/03519 123/516 |
| 6,742,536 | B2 * | 6/2004 | Mills | B60K 15/03519 137/15.17 |
| 6,779,544 | B2 | 8/2004 | Devall | |
| 6,840,264 | B1 * | 1/2005 | Bhavsar | B29C 65/02 137/202 |
| 6,843,267 | B1 * | 1/2005 | Van Schaftingen | B60K 15/03177 137/202 |
| 6,863,082 | B1 * | 3/2005 | McIntosh | B60K 15/03519 137/202 |
| 6,918,405 | B2 * | 7/2005 | Leonhardt | B60K 15/03519 137/202 |
| 6,932,103 | B2 | 8/2005 | Iwamoto | |
| 6,966,330 | B2 * | 11/2005 | Frohwein | F16K 24/04 137/202 |
| 7,017,607 | B2 * | 3/2006 | Brand | B60K 15/00 137/43 |
| 7,131,452 | B2 * | 11/2006 | Potter | B60K 15/03519 137/15.17 |
| 7,152,586 | B2 * | 12/2006 | Aoki | B60K 15/03519 123/516 |
| 7,278,439 | B2 * | 10/2007 | Gerard | B29C 65/1412 137/15.01 |
| 7,418,975 | B2 * | 9/2008 | Nojiri | F16K 24/044 137/202 |
| 7,513,379 | B2 * | 4/2009 | Gerard | B29C 66/7234 220/562 |
| 7,748,397 | B2 * | 7/2010 | Firtion | B60K 15/03 137/15.17 |
| 7,770,593 | B2 * | 8/2010 | Moses | B60K 15/035 137/202 |
| 7,784,484 | B2 * | 8/2010 | Furuya | F16K 24/044 137/202 |
| 7,886,759 | B2 * | 2/2011 | Miyoshi | B60K 15/03519 137/202 |
| 7,934,514 | B2 * | 5/2011 | Yamada | F16K 24/044 137/202 |
| 8,091,578 | B2 * | 1/2012 | Roth | F16K 1/02 137/202 |
| 8,100,153 | B2 * | 1/2012 | Hirata | F16K 31/22 137/202 |
| 8,464,764 | B1 * | 6/2013 | Milsom | B60K 15/03519 137/202 |
| 8,550,107 | B2 * | 10/2013 | Roscher | B60K 15/03504 137/202 |
| 8,678,218 | B2 * | 3/2014 | Roscher | B60K 15/03519 137/202 |
| 8,689,816 | B2 * | 4/2014 | Pifer | F16K 24/044 137/202 |
| 9,016,309 | B2 * | 4/2015 | Ito | F02M 25/0836 137/351 |
| 9,057,304 | B2 | 6/2015 | Huethwohl | |
| 9,360,872 | B2 * | 6/2016 | Pifer | F16K 24/044 |
| 10,035,091 | B2 * | 7/2018 | Takahashi | G05D 7/01 |
| 10,060,544 | B2 * | 8/2018 | Song | F16K 24/044 |
| 10,369,882 | B2 * | 8/2019 | Mihara | F02M 37/0023 |
| 2001/0004890 | A1 | 6/2001 | Shimamura et al. | |
| 2001/0020487 | A1 * | 9/2001 | Rosseel | B60K 15/03519 137/202 |
| 2003/0098062 | A1 * | 5/2003 | Engle | B60K 15/03519 137/202 |
| 2004/0045602 | A1 * | 3/2004 | Palvolgyi | F16K 17/36 137/202 |
| 2004/0238033 | A1 | 12/2004 | Miyoshi et al. | |
| 2005/0034759 | A1 | 2/2005 | McIntosh et al. | |
| 2005/0087227 | A1 * | 4/2005 | Powell | F16K 24/044 137/202 |
| 2007/0000542 | A1 * | 1/2007 | Johansen | F16K 24/044 137/202 |
| 2007/0006919 | A1 * | 1/2007 | Tagami | F16K 24/044 137/202 |
| 2007/0193561 | A1 * | 8/2007 | Benjey | B60K 15/03519 123/518 |
| 2009/0000599 | A1 * | 1/2009 | Vulkan | B29C 65/342 123/509 |
| 2009/0211649 | A1 * | 8/2009 | Miura | B60K 15/035 137/202 |
| 2010/0089466 | A1 * | 4/2010 | Kobayashi | B60K 15/03519 137/409 |
| 2010/0252125 | A1 | 10/2010 | Roth et al. | |
| 2017/0274760 | A1 * | 9/2017 | Mihara | B60K 15/035 |
| 2018/0354358 | A1 * | 12/2018 | Madoux | B60K 15/035 |

FOREIGN PATENT DOCUMENTS

| | | |
|---|---|---|
| JP | 2006-097537 | 4/2006 |
| JP | 2010-999 | 1/2010 |
| WO | 2007/093881 | 8/2007 |

OTHER PUBLICATIONS

English language PCT International Preliminary Report on Patentability dated Jul. 28, 2015, received in corresponding PCT Application No. PCT/EP14/65720, 7 pgs.

(56) References Cited

OTHER PUBLICATIONS

Office Action from related Japanese Appln. No. 2016-515953, dated Feb. 20, 2017. English translation attached.

* cited by examiner

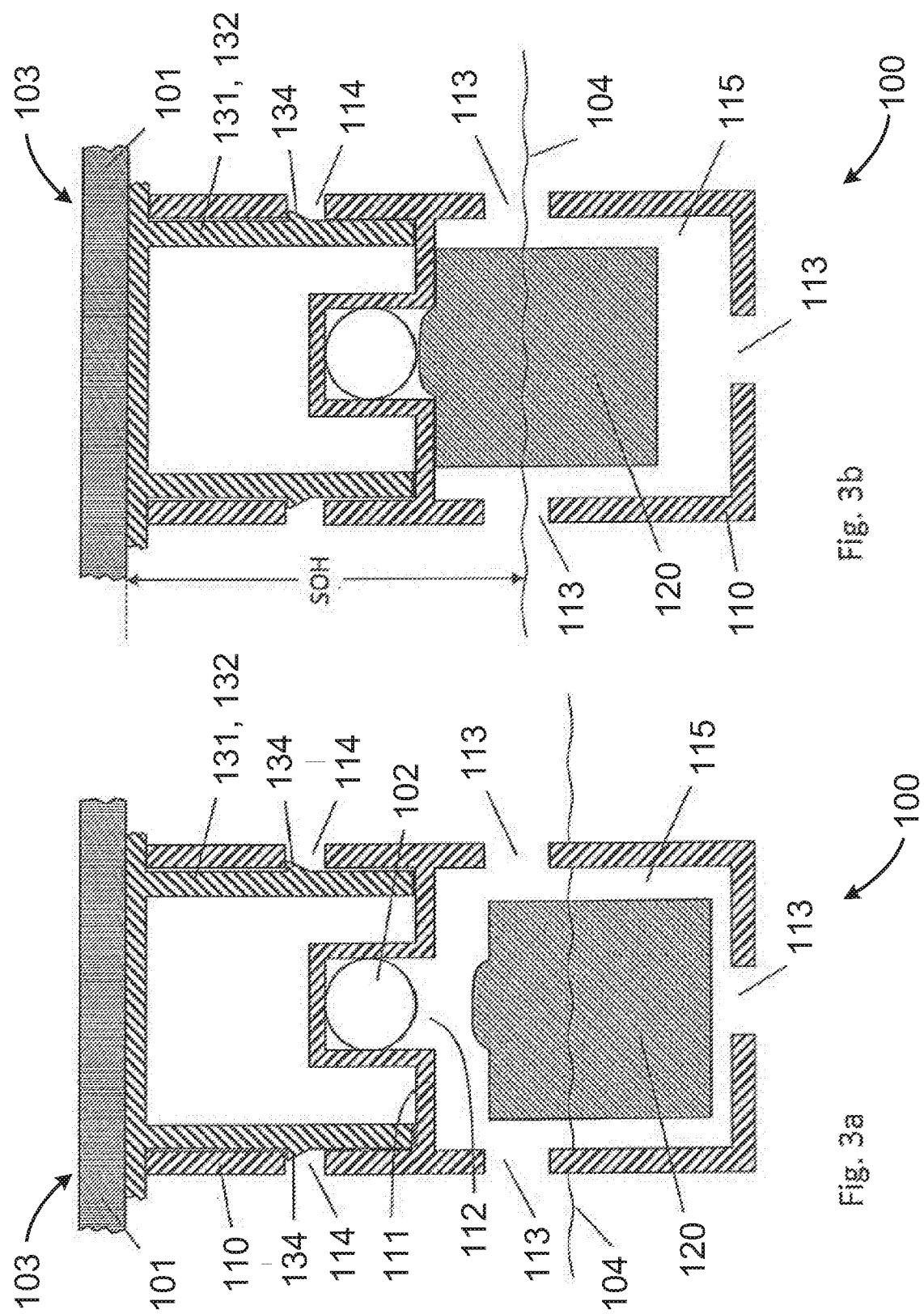

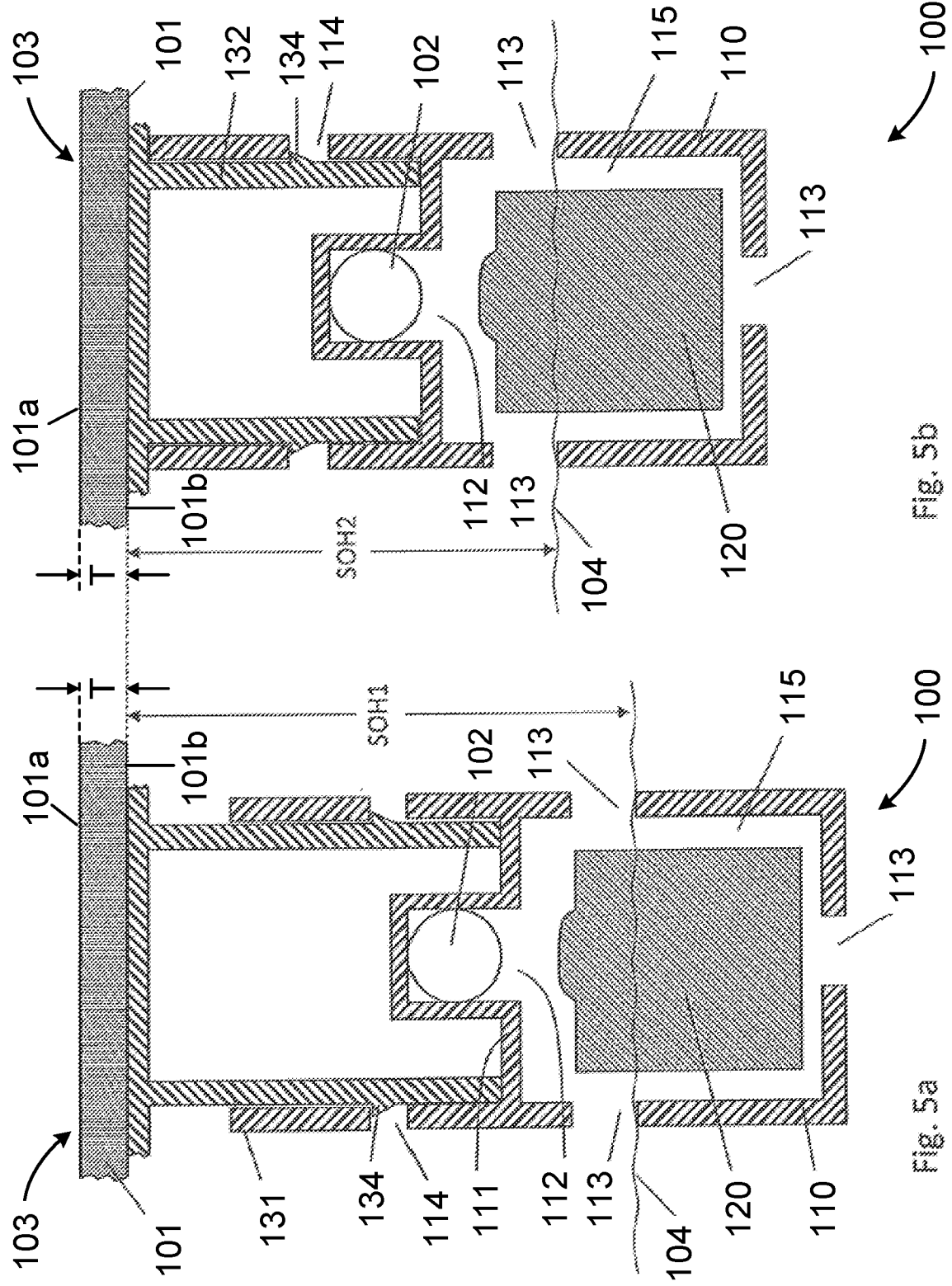

UNIVERSAL SHUTOFF VALVE

FIELD

The present invention relates to a venting and/or air admission valve, which is also referred to as a shutoff valve, for an operating fluid reservoir. The present invention furthermore relates to an operating fluid reservoir having a venting and/or air admission valve and to a venting and/or air admission valve system.

The operating fluid reservoir can be a fluid reservoir for aqueous urea solution required for an SCR method (Selective Catalytic Reduction) for lowering nitrogen oxide emissions from diesel vehicles. This aqueous urea solution is injected into the exhaust section from the SCR catalyst, e.g. by means of a dosing pump or an injector. In the following text, reference will be made to a fuel reservoir, although all the embodiments can also be used in a corresponding manner for fluid reservoirs for aqueous urea solution or more generally for operating fluid reservoirs.

BACKGROUND

To fill a fuel reservoir with fuel, the usual practice is to insert a fuel pump nozzle into a filler pipe opening into the fuel reservoir, thereupon allowing fuel to be introduced into the fuel reservoir. To enable the fuel reservoir to be filled unhindered, the air in the fuel reservoir or the air/gas mixture in the fuel reservoir must be able to escape from the fuel tank since, otherwise, a pressure rise within the fuel tank would hinder the filling process.

To vent air from the fuel reservoir, one or more venting valves in fluid communication with a vent line are provided in the fuel reservoir, wherein the vent line can optionally be in fluid communication with an activated carbon filter. Air/gas mixture displaced from the fuel reservoir is either filtered by the activated carbon filter, ensuring that only small quantities of fuel vapor, if any, are released to the environment, or, in the absence of an activated carbon filter, are released directly to the atmosphere.

Venting and/or air admission valves known from the prior art, which are also referred to below simply as venting valves or shutoff valves, comprise a hollow valve housing, which has at least one communication opening, by means of which a valve housing interior is in fluid communication with the environment thereof. When the venting valve is installed in a fuel reservoir, the valve housing interior is in fluid communication via the communication opening with the fuel reservoir interior, thus allowing an exchange of fuel and of a fuel vapor/air mixture between the fuel reservoir interior and the valve housing interior via the communication opening. The valve housing interior is in fluid communication with a vent line via a ventilation opening arranged in a valve seat. A valve body, which can move freely in the valve housing interior and is also referred to as a float or float element or buoyant element, closes the ventilation opening at and above a predetermined operating fluid level within the fuel reservoir, thus preventing liquid and/or gas escaping from the valve housing. Below the predetermined operating fluid level, the valve body is at a distance from the ventilation opening, with the result that the valve housing interior and the ventilation line are in fluid communication.

The distance between the operating fluid level and the fuel reservoir inner wall on which the venting valve is fastened at which the valve body is subject to so much lift by the fuel that it closes the ventilation opening is referred to as the shutoff height.

If the fuel reservoir warms up, e.g. due to an adjacent exhaust system or due to a high ambient temperature, the vapor pressure of the fuel within the fuel reservoir rises. When the shutoff valve is closed by the fuel level and there is no second venting path or when the second venting path is closed by a pressure relief valve (also called a pressure retention valve), the tank internal pressure rises, causing the fuel reservoir to expand. This, in turn, has the result that the operating fluid level in the fuel reservoir falls, as a result of which too the valve body falls in the valve housing and moves away from the valve seat and thus exposes the ventilation opening. The excess pressure built up in the fuel reservoir can thus escape via the reopened valve. This process is repeated until the supply of heat has ceased or an equilibrium has established itself between the liberation of gas due to the supply of heat and leakage through the pressure relief valve.

It is desirable to be able to achieve different shutoff heights for an operating fluid reservoir, e.g. for a fuel reservoir. This may be necessary if a motor vehicle is to be sold in different countries, in which different regulations apply to fuel reservoirs, or if the same valve is to be used for several reservoirs. For this purpose, the prior art includes what are known as "riser pipe shutoff valves", in which the lateral communication openings are extended as far down as the desired shutoff height in the installed position, making it possible to achieve closure of the venting valve or riser pipe shutoff valve in the case of a lower operating fluid level. For different shutoff heights, it is then necessary in each case to use different venting valves or riser pipe shutoff valves, each with different valve housings, in which the positions of the communication openings are matched to the desired shutoff height.

With this kind of riser pipe shutoff valve, it is possible during the filling of a fuel reservoir for the displaced fuel vapor/air mixture to be carried away via the communication opening and the vent opening to the activated carbon filter or to the atmosphere as long as the communication opening is not closed by the fuel in the fuel reservoir. With this type of venting valve, the shutoff height is the distance between the fuel reservoir inner wall and the upper edge of the communication opening. When the operating fluid level has reached the shutoff height, gas exchange between the fuel reservoir interior and the valve housing interior is no longer possible. If more fuel is introduced, it rises in the filler pipe, causing a corresponding rise in the pressure within the fuel reservoir, thereby raising the fuel column within the valve housing and hence also the valve body by virtue of the buoyancy thereof. Above a predetermined fuel level within the valve housing, the valve body closes the vent opening.

If a motor vehicle with a fuel reservoir having a correspondingly designed riser pipe shutoff valve is parked with a full or approximately full fuel tank and the fuel tank then warms up, the excess pressure which arises due to evaporation of the fuel should be discharged by pressure relief valves. However, the opening pressure of such a pressure relief valve is matched to the height of the filler pipe and, as a result, the fuel reservoir often expands before the pressure relief valve opens. In such a case, the operating fluid level in the fuel reservoir falls. As a result, an upper part of the communication opening is no longer closed by the fuel, allowing the fuel vapor/air mixture in the compensating volume of the fuel tank to spread through the upper section of the communication opening into the valve housing interior. Since the operating fluid level within the valve housing interior is higher than in the fuel reservoir interior, the fuel vapor/air mixture rises to the surface of the fuel column within the valve housing interior in the form of gas bubbles. This in turn reduces the lift on the valve body since the gas bubbles in the fuel reduce the effective density thereof. As a result, the valve body no longer closes the ventilation opening.

The gas bubbles rising to the surface of the fuel entrain fuel in the form of small droplets as they pass through the surface of the fuel, and these too spread out in the direction of the ventilation opening and pass through the ventilation opening into the ventilation line and, via the latter, into the activated carbon filter. If the motor vehicle is parked in a warm environment for a prolonged period, the process of fuel loss described above continues for a long period via the ventilation line, and significant quantities of fuel can thereby be lost via the venting and/or air admission system. As a result, the ability to function of the activated carbon filter is massively impaired, and more fuel vapor is released to the environment.

SUMMARY

It is the underlying object of the present invention to provide an improved venting and/or air admission valve for an operating fluid reservoir, e.g. for a fuel reservoir or for an SCR fluid reservoir, in which different shutoff heights can be achieved with one valve housing and which has a significantly reduced fuel loss, if any, when an operating fluid reservoir fitted with the venting and/or air admission valve according to the invention is subjected to heat in the full or approximately full state.

According to the invention, this object is achieved by the features indicated in claim 1. Advantageous embodiments are indicated in the dependent claims.

More precisely, the venting and/or air admission valve according to the invention comprises a hollow valve housing, which can be fastened in an interior of an operating fluid reservoir and which comprises at least one communication opening for fluid exchange between a valve housing interior and the interior of the operating fluid reservoir, and a ventilation opening for gas exchange between the valve housing interior and a ventilation line. The venting and/or air admission valve according to the invention furthermore comprises a valve body arranged in the valve housing interior. In the installed position of the venting and/or air admission valve in the operating fluid reservoir, i.e. when the venting and/or air admission valve is installed in the operating fluid reservoir, the valve body is at a distance from the ventilation opening when an operating fluid level within the interior of the operating fluid reservoir is below a predetermined shutoff level, with the result that the valve housing interior and the ventilation line are in fluid communication. On the other hand, in the installed position of the venting and/or air admission valve in the operating fluid reservoir, the valve body is subject to a lift from the operating fluid in the valve housing interior such that the valve body closes the ventilation opening when an operating fluid level within the interior of the operating fluid reservoir is above the shutoff level, with the result that the valve housing interior and the ventilation line are not in fluid communication. The venting and/or air admission valve is distinguished by the fact that it comprises an adapter, which can be fastened on an operating fluid reservoir wall, and that the valve housing can be fastened on the adapter in such a way that the adapter is arranged between the operating fluid reservoir wall and the valve housing.

The venting and/or air admission valve according to the invention offers the advantage that different shutoff heights can be achieved for an operating fluid reservoir fitted with the venting and/or air admission valve using just a single valve housing. This is because using different adapters, each of which can be connected to the operating fluid reservoir wall, enables the shutoff level at which the valve body closes the ventilation opening to be adapted in an appropriate manner since the shutoff level is directly correlated with the shutoff height. The greater the shutoff height, the lower is the shutoff level.

It is furthermore possible to achieve different shutoff heights, and the position of the communication opening or communication openings can simultaneously be chosen in such a way that the operating fluid level is in the region of the communication opening, despite the shutoff level being reached by the operating fluid. When the operating fluid reservoir heats up, a gas exchange between the valve housing interior and the interior of the operating fluid reservoir will consequently continue to be possible. Since the gas does not have to rise through a liquid column in the valve housing interior for gas exchange between the interior of the operating fluid reservoir and the valve housing interior, the gas does not entrain any droplets of liquid either, and therefore no liquid can penetrate into the ventilation line. In the case of an operating fluid reservoir designed as a fuel reservoir fitted with the venting and/or air admission valve according to the invention, said reservoir would consequently exhibit significantly reduced fuel loss if the fuel tank were parked in a warm environment in the full or approximately full state and the fuel in the fuel reservoir therefore evaporated to an appreciable extent.

The venting and/or air admission valve according to the invention can also be referred to as a shutoff valve since it serves to prevent gas exchange from the operating fluid reservoir to the environment from a predetermined operating fluid level, resulting in a rise in the pressure within the operating fluid reservoir, whereupon the level of an operating fluid introduced into the filler pipe rises, thereupon enabling the filling process to be ended by means of the fuel pump nozzle.

The valve body, which can also be referred to as a float or as a buoyant element, can move freely in a vertical direction in the installed position.

The adapter is configured to be connected positively and/or materially to the operating fluid reservoir wall. The adapter can be fastened on the operating fluid reservoir wall by an adhesive bond or by a weld, for example. As an alternative, it is also possible for the adapter to be connected to the operating fluid reservoir wall by means of a latching connection. It is furthermore also possible for the adapter to be connected to the operating fluid reservoir wall by means of a riveted joint.

The adapter preferably comprises a first fastening device, and the valve housing preferably comprises a second fastening device. The first fastening device and the second fastening device are designed in such a way that the valve housing can be fastened to the adapter by means of the two fastening devices.

The first fastening device is preferably designed as a latching device and the second fastening device is preferably designed as a latching opening. As an alternative, it is also possible for the first fastening device to be designed as a latching opening and for the second fastening device to be designed as a latching device.

This allows rapid fastening of the valve housing on the adapter since the valve housing can be connected to the adapter simply by being pushed onto the latter.

As an alternative, however, it is also possible for the valve housing to be adhesively bonded or welded to the adapter. This has the advantage that neither the valve housing nor the adapter has to have special fastening devices and that there is freedom in establishing the position of connection between the valve housing and the adapter. As a result, continuous shutoff heights can be achieved in different operating fluid reservoirs, while only a single valve housing has to be installed.

Consequently, it is not necessary to adapt the air admission system for the operating fluid reservoir to different characteristics of different valve housings.

FIGURES

Figure 1B:
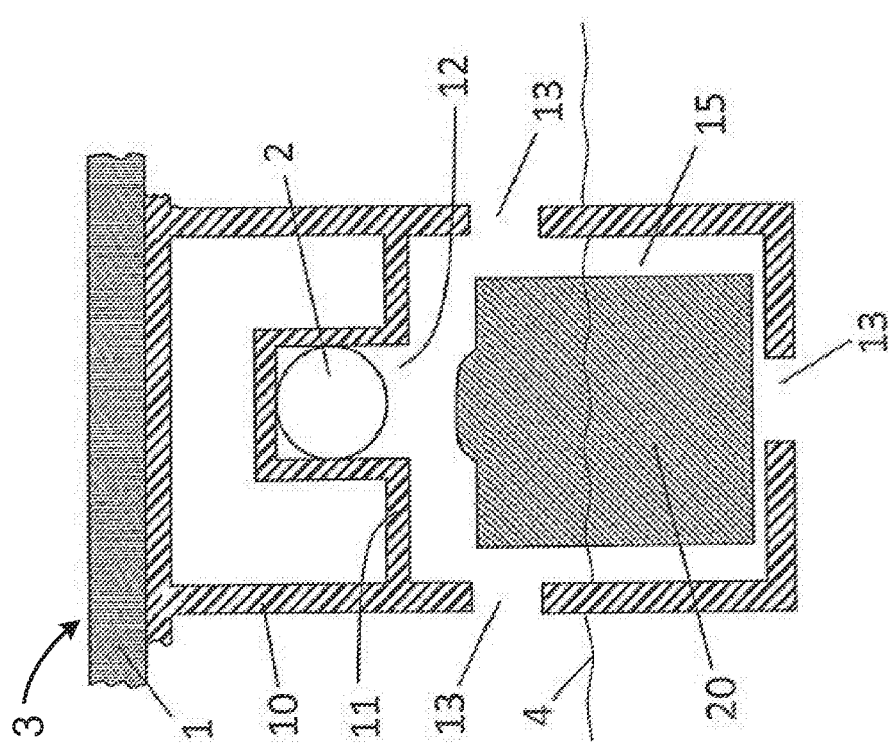
Figure 2A:
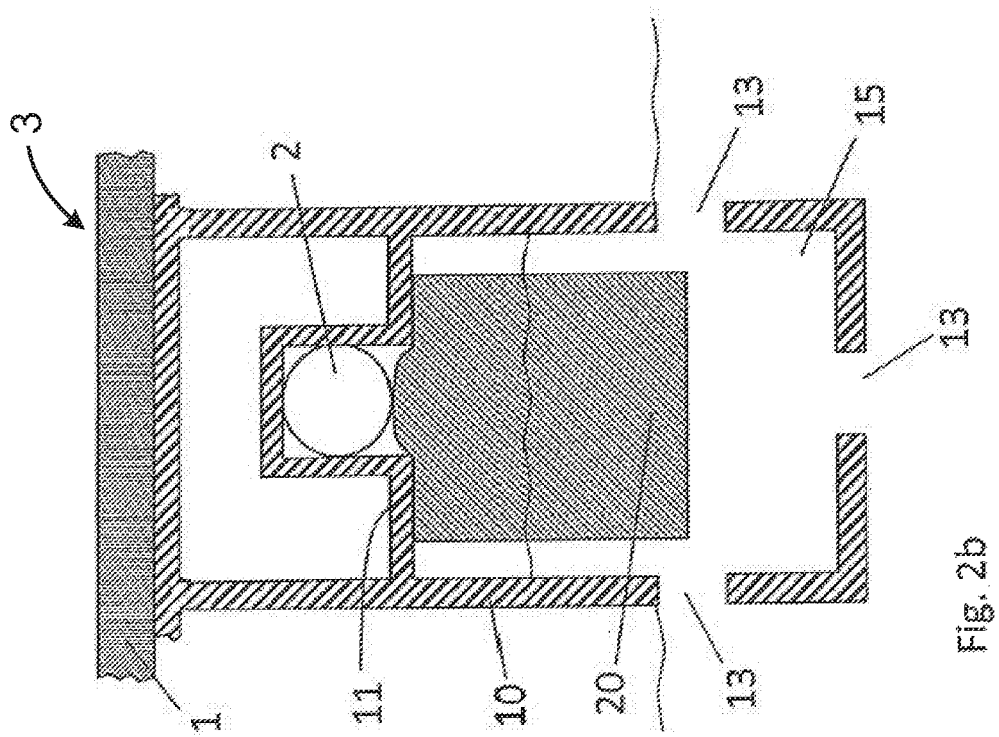
Figure 2B:
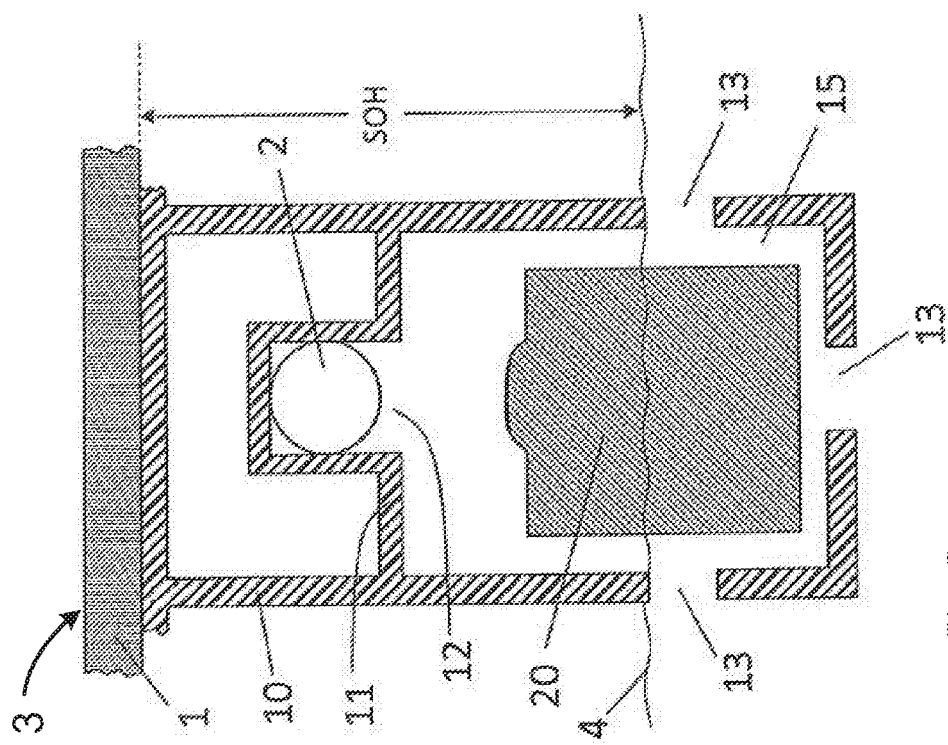
Figure 4:
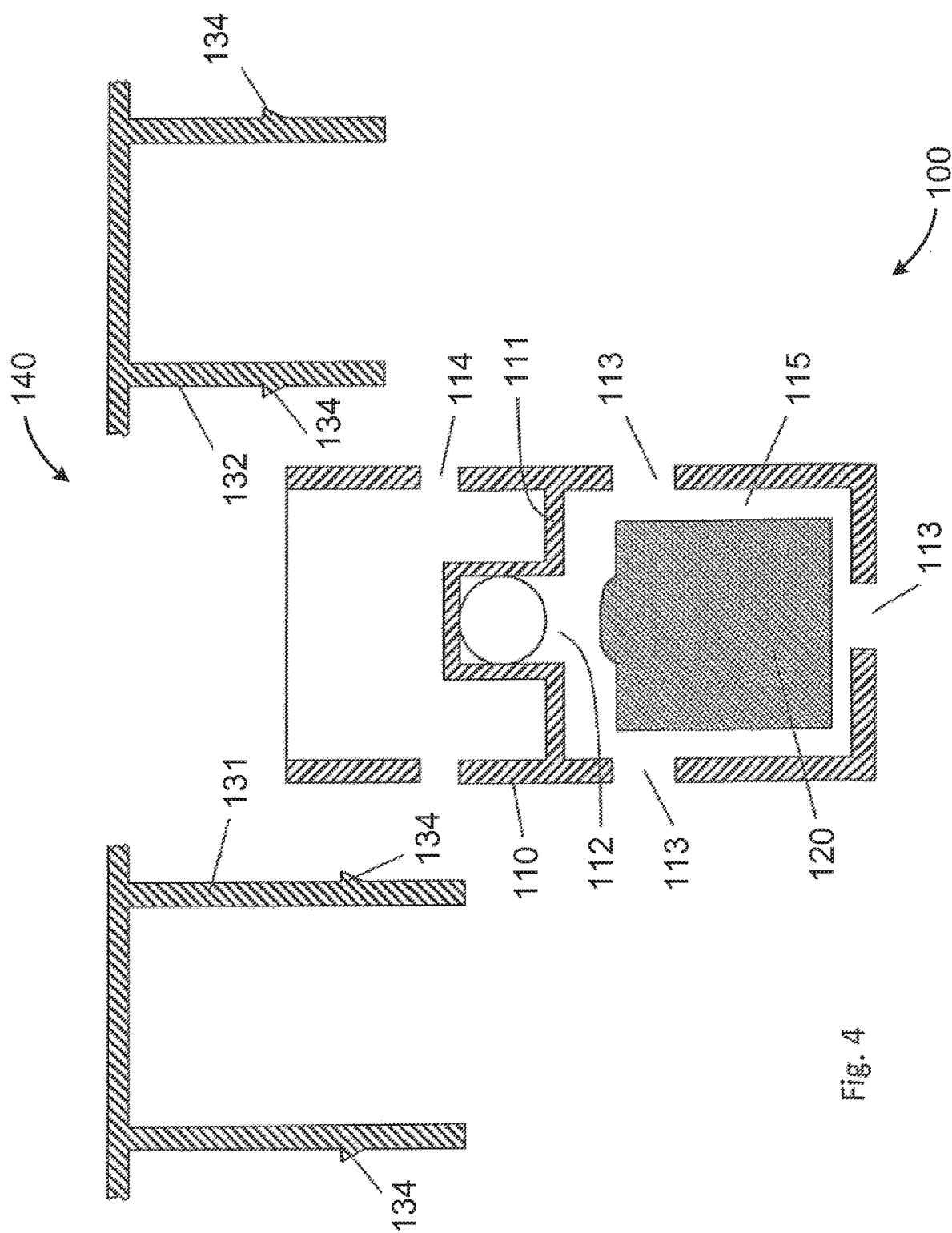

Further advantages, details and features of the invention will become apparent below from the illustrative embodiments which are explained. More specifically:

FIG. 1a: shows a cross section through a schematically illustrated shutoff valve known from the prior art, which is fastened on an operating fluid reservoir wall and in which the ventilation opening is not closed by the valve body;

FIG. 1b: shows the shutoff valve illustrated in FIG. 1a, in which the vent opening is closed by the valve body;

FIG. 2a: shows a cross section through a schematically illustrated riser pipe shutoff valve known from the prior art, which is fastened on an operating fluid reservoir wall and in which the ventilation opening is not closed by the valve body;

FIG. 2b: shows the riser pipe shutoff valve illustrated in FIG. 2a, in which the vent opening is closed by the valve body;

FIG. 3a: shows a cross-sectional illustration of a schematically illustrated venting and/or air admission valve according to the invention, in which the ventilation opening is not closed by the valve body;

FIG. 3b: shows the venting and/or air admission valve illustrated in FIG. 3a, in which the vent opening is closed by the valve body;

FIG. 4: shows a cross-sectional illustration of a schematically illustrated venting and/or air admission valve system according to the invention having a first and a second adapter in the disassembled state;

FIG. 5a: shows a cross-sectional illustration of a venting and/or air admission valve, which is obtained when the first adapter is assembled with the valve housing of the venting and/or air admission valve system illustrated in FIG. 4; and FIG. 5b: shows a cross-sectional illustration of a venting and/or air admission valve, which is obtained when the second adapter is assembled with the valve housing of the venting and/or air admission valve system illustrated in FIG. 4.

DETAILED DESCRIPTION

In the description which now follows, the same reference signs denote identical components or identical features, and therefore a description relating to one component, given with reference to one figure, also applies to the other figures, avoiding repetition in the description.

In the following description, reference is furthermore made to a fuel reservoir and to a fuel reservoir wall, but the present invention can be applied more generally to operating fluid reservoirs, e.g. in the form of an SCR fluid reservoir.

In each of FIGS. 1a and 1b, a shutoff valve known from the prior art is illustrated in cross section, wherein the shutoff valve in FIG. 1a is in an open state, in which gas exchange between the interior of the operating fluid reservoir and the environment is possible, whereas the shutoff valve in FIG. 1b is illustrated in a closed state, in which gas exchange between the interior of the operating fluid reservoir and the environment thereof is prevented.

The shutoff valve known from the prior art comprises a valve housing 10, which is fastened on a fuel reservoir wall 1, for example. This fastening can be accomplished by welding the valve housing 10 on the fuel reservoir wall 1. In the shutoff valve illustrated, the valve housing 10 comprises three communication openings 13, which are designed for fluid exchange between a valve housing interior 15 and the fuel reservoir interior. The valve housing 10 furthermore comprises a ventilation opening 12, which is arranged in a valve seat 11 and is designed for gas exchange between the valve housing interior 15 and a ventilation line 2.

Arranged in the valve housing interior 15 is a valve body 20, which can move freely in a vertical direction within the valve housing interior. When submerged in the operating fluid or in the fuel, the valve body 20 is subject to a corresponding lift and consequently varies its vertical position in the valve housing 10 in accordance with the fuel level.

In FIG. 1a, the fuel level 4 is so low that the valve body 20 is at a distance from the ventilation opening 12, with the result that the valve housing interior 15 and the ventilation line 2 are in fluid communication with one another. Thus, if there is an increase in the gas pressure within the fuel tank, e.g. due to heating, an excess pressure which is established can be relieved to the ventilation line 2 via the communication openings 13, which are arranged in side walls of the valve housing 10, and via the ventilation opening 12.

In FIG. 1b, the fuel level 4 is higher than that illustrated in FIG. 1a, and, owing to the lift of the valve body 20 by the higher fuel level 4, the valve body therefore closes the ventilation opening 12, as a result of which the valve housing interior 15 and the ventilation line 2 are no longer in fluid communication with one another. If fuel continues to be introduced into the fuel tank, it is thus no longer possible for an excess pressure to be equalized to the ventilation line 2 via the communication openings 13 and the ventilation opening 12, and therefore further introduction of fuel leads to a rise in the fuel column in the filler pipe, thus allowing the filling process to be interrupted automatically when the fuel column within the filler pipe reaches the fuel pump nozzle.

If, on the other hand, a vehicle is parked with a fuel reservoir in the full or approximately full state and the fuel reservoir heats up, some of the fuel in the fuel reservoir evaporates, causing the internal pressure in the fuel reservoir to rise. Owing to this pressurization, the fuel reservoir expands, and the fuel level 4 therefore falls again. As the fuel level falls, the valve body 20 also moves away from the ventilation opening 12, allowing an excess pressure in the fuel reservoir to be dissipated.

The shutoff valve illustrated in FIGS. 1a and 1b has the disadvantage that different shutoff valves have to be used for different fuel reservoirs, in which different shutoff heights are necessary.

To solve this problem, "riser pipe shutoff valves" are known from the prior art, and these are illustrated schematically in FIGS. 2a and 2b.

In the case of the riser pipe shutoff valve illustrated in FIGS. 2a and 2b, the lateral communication openings are moved down as far as the desired shutoff height SOH in the installed position, making it possible to achieve closure of the riser pipe shutoff valve at a lower operating fluid level or fuel level. For different shutoff heights SOH, it is then necessary to use different venting valves or riser pipe shutoff valves with different valve housings 10 in each case, where the position of the communication openings 13 in the side walls of the valve housing 10 has to be adapted to match the desired shutoff height SOH.

In the case of a riser pipe shutoff valve, it is possible during the filling of the fuel reservoir for the displaced fuel vapor/air mixture to be carried away to an activated carbon filter via the communication openings 13, which are arranged in the side walls of the valve housing, the vent opening 12 and the vent line 2 as long as the lateral communication openings 13 are not closed by the fuel in the fuel reservoir. The shutoff height SOH with this type of riser pipe shutoff valve is therefore the distance between the fuel reservoir inner wall 1 and the upper edge of the lateral communication openings 13. When the fuel level 4 reaches the shutoff height, gas exchange between the fuel reservoir interior and the valve housing interior 15 is no longer possible. This state is illustrated in FIG. 2a. If more fuel is introduced, it rises in the filler pipe that opens into the fuel reservoir, with the result that there is a corresponding increase in the pressure within the fuel reservoir, causing the fuel column within the valve housing 10 and hence also the valve body 20, owing to the buoyancy thereof, to be raised. From a predetermined fuel level within the valve housing 10, the valve body 20 closes the vent opening 12, as illustrated in FIG. 2b.

If a motor vehicle having a fuel reservoir with a correspondingly designed riser pipe valve is parked with a full or approximately full fuel tank (state in FIG. 2b) and the fuel tank then heats up, the excess pressure caused by evaporation of the fuel should be discharged by pressure relief valves. However, the opening pressure of the pressure relief valve is matched to the height of the filler pipe, with the result that the fuel reservoir often expands before the pressure relief valve opens. The expansion of the fuel tank causes the fuel level in the fuel reservoir to fall, with the result that an upper part of the lateral communication openings 13 is no longer closed by the fuel. The fuel vapor/air mixture in the compensating volume of the fuel reservoir can therefore spread through the upper section of the communication opening 13 into the valve housing interior 15. However, since the fuel level within the valve housing interior 15 is higher than in the fuel reservoir interior, the fuel vapor/air mixture rises to the surface of the fuel column within the valve housing interior 15 in the form of gas bubbles, which, in turn, reduces the lift on the valve body 20 in the valve housing interior 15 since the gas bubbles in the fuel reduce the effective density thereof. As a result, the valve body 10 falls and therefore no longer closes the ventilation opening 12.

The gas bubbles rising to the surface of the fuel entrain fuel in the form of small droplets as they pass through the surface of the fuel, and these too spread out in the direction of the ventilation opening 12 and pass through the ventilation opening 12 into the ventilation line 2 and, via the latter, into the activated carbon filter. If the motor vehicle is parked in a warm environment for a prolonged period, this process of fuel loss continues for a prolonged period via the ventilation line, and relatively large quantities of fuel can thereby be lost via the venting and/or air admission system.

A venting and/or air admission valve 100 according to the invention, which can also be referred to as a shutoff valve, is illustrated in cross section in FIGS. 3a and 3b, wherein the shutoff valve 100 in FIG. 3a is illustrated in a state in which the ventilation opening 112 is not closed by the valve body 120, whereas in FIG. 3b the shutoff valve 100 is illustrated in a state in which the vent opening 112 is closed by the valve body 120. The shutoff valve 100 comprises an adapter 131, 132, which can be fastened on the operating fluid reservoir wall 101 of operating fluid reservoir 103. This fastening on the operating fluid reservoir wall 101, which is a fuel reservoir wall 101 in the illustrative embodiment shown, can be accomplished by means of an adhesive joint, a welded joint or a riveted joint, for example. As an alternative, it is also possible for the adapter 131, 132 to be connected to the fuel reservoir wall 101 by means of correspondingly designed latching devices. From FIGS. 3a and 3b, it can be seen that the valve housing 110 is fastened to the adapter 131, 132 in such a way that the adapter 131, 132 is arranged between the fuel reservoir wall 101 and the valve housing 110.

To fasten the valve housing 110 on the adapter 131, 132, the adapter 131, 132 has a fastening device 134 in the form of one or more latching devices 134 in the form of latching tongues 134, and the valve housing 10 comprises a second fastening device 114 in the form of a number of latching openings 114 (shown as through-holes in the side walls of the adapter 131, 132) corresponding to the number of latching devices 134. As shown, the side walls of the adapter 131, 132 and the valve housing 110 are parallel with one another in the direction of lift of the valve body 120, and the latching devices 134 and latching openings 114 are disposed on the side walls of the adapter 131, 132 and the valve housing 110 which are parallel. Pushing the valve housing 110 onto the adapter 131, 132 causes the latching tongues 134 to force the valve housing side walls apart until the latching tongues 134 latch into the latching openings 114. As an alternative, it is also possible for the valve housing 110 to be fastened on the adapter 131, 132 by an adhesive joint or by a welded joint. As an alternative, the adapter 131, 132 could also be screwed to the valve housing 110. It is also conceivable to design the adapter 131, 132 as a screw, thus making possible continuously variable adaptation.

The way in which the shutoff valve 100 illustrated in FIGS. 3a and 3b operates is otherwise identical with the shutoff valve illustrated in FIGS. 1a and 1b. Consequently, the shutoff valve 100 according to the invention does not have the disadvantage that, when the fuel tank is subjected to pressure, fuel can enter the vent line 102 in liquid form, as is the case with riser pipe shutoff valves which are illustrated in FIGS. 2a and 2b. Moreover, different adapters 131, 132 make it possible to achieve different shutoff heights SOH, and, as a result, only a single valve housing 110 is necessary to achieve different shutoff heights for different fuel reservoirs. This considerably simplifies the stocking of shutoff valves 100 since it is not necessary to use different shutoff valves 100 for different fuel reservoirs or, more generally, for different operating fluid reservoirs 103.

FIG. 4 shows a venting and/or air admission system 140 according to the invention having a first adapter 131 and a second adapter 132 in the disassembled state and in cross section. From FIG. 4, it can be seen that the axial extent of the first adapter 131 is greater than the axial extent of the second adapter 132.

When the valve housing 110 illustrated in FIG. 4 is assembled with the first adapter 131 and subsequently mounted in a fuel reservoir 103 on a fuel reservoir wall 101, the shutoff valve illustrated in FIG. 5a is obtained. If, on the other hand, the valve housing 110 illustrated in FIG. 4 is connected to the second adapter 132, the shutoff valve 100 illustrated in FIG. 5b is obtained. As shown in FIG. 4, the valve housing 110 is configured to be fastened on each one of the first adapter 131 to the exclusion of the second adaptor 132, or the second adapter 132 to the exclusion of the first adaptor 131. As shown in FIG. 5a and FIG. 5b, when each adaptor 131/132 is fastened inside the operating fluid reservoir 103 on the overlying inner face 101b of the operating fluid reservoir wall 101 (i.e. which faces the interior of the operating fluid reservoir 103 and fluid when stored therein, and is opposite the outer face 101a separated by the thickness T of the operating fluid reservoir wall 101), respectively, such are configured to be fastened on the inner face 101b of the operating fluid reservoir wall 101 without extending through the operating fluid reservoir wall 101, whereby a through-opening in the operating fluid reservoir wall 101 is not present.

In the shutoff valve 100 illustrated in FIG. 5a, the first shutoff height SOH 1, which corresponds to the first adapter 131, is greater than the second shutoff height SOH2, which corresponds to the second adapter 132. To achieve different shutoff heights SOH, all that is necessary is thus to stock different adapters 131, 132, which each have to be connected to identical valve housings 110.

REFERENCE SIGNS

100 venting and/or air admission valve/shutoff valve
1, 101 operating fluid reservoir wall/fuel reservoir wall
2, 102 ventilation line
3, 103 operating fluid reservoir/fuel reservoir
4, 104 operating fluid level/fuel level
10, 110 valve housing
11, 111 valve seat
12, 112 ventilation opening
13, 113 communication opening
14, 114 fastening opening/latching opening (of the valve housing)
15, 115 valve housing interior
20, 120 valve body/buoyant element/float
31, 131 adapter/first adapter
32, 132 adapter/second adapter
34, 134 fastening device/latching device/latching tongue (of the adapter)
140 venting and/or air admission system
SOH shutoff height
SOH1 first shutoff height
SOH2 second shutoff height

What is claimed is:

1. A valve system, comprising:
a valve configured to operate as at least one of a venting valve and an air admission valve;
the valve including a hollow valve housing, which is configured to be located in an interior of an operating fluid reservoir;
the valve housing including at least one communication opening for fluid exchange between a valve housing interior and the interior of the operating fluid reservoir;
the valve housing including a ventilation opening for gas exchange between the valve housing interior and a ventilation line;
the valve including a single valve body arranged in the valve housing interior, whereby the valve only has one valve body;
in an installed position of the valve in the operating fluid reservoir, the valve body is configured to be at a distance from the ventilation opening when an operating fluid level of operating fluid within the interior of the operating fluid reservoir is below a shutoff level, such that the valve housing interior and the ventilation line are in fluid communication;
in the installed position of the valve in the operating fluid reservoir, the valve body is configured to be subjected to a lift from the operating fluid in the valve housing interior such that the valve body closes the ventilation opening when the operating fluid level within the interior of the operating fluid reservoir is above the shutoff level, such that the valve housing interior and the ventilation line are not in fluid communication;
the valve comprises an adapter, which is configured to be fastened on an inner face of an operating fluid reservoir wall of the operating fluid reservoir, wherein the inner face faces the interior of the operating fluid reservoir to contain the operating fluid and is disposed opposite an outer face of the tank;
the valve housing configured to be fastened on the adapter such that the adapter is arranged between the operating fluid reservoir wall and the valve housing;
the adapter comprises a plurality of first fastening devices, wherein the plurality of the first fastening devices are spaced apart from each other angularly around a longitudinal axis of the adapter such that the plurality of the first fastening devices are not aligned with each other along the longitudinal axis of the adapter;
the valve housing comprises a plurality of second fastening devices, wherein the plurality of the second fastening devices are spaced apart from each other angularly around a longitudinal axis of the valve housing such that the plurality of second fastening devices are not aligned with each other along the longitudinal axis of the valve housing;
the valve housing configured to be fastened on the adapter by each one of the plurality of the second fastening devices and each one of the plurality of the first fastening devices;
at least one of the plurality of first fastening devices includes a latching device and at least one of the plurality of second fastening devices includes a latching opening;
the adapter is configured to be connected at least one of positively and materially to the operating fluid reservoir wall; and
wherein, during the valve housing being fastened on the adapter, the latching device of the adapter forces the side wall of the valve housing to move until the latching device latches into the latching opening of the valve housing.

2. The valve system as claimed in claim 1, further comprising:
the operating fluid reservoir with the operating fluid reservoir wall;
the valve housing located in the interior of the operating fluid reservoir;
a vent line located in the interior of the operating fluid reservoir;
the vent line in fluid communication with the valve via the ventilation opening;
the valve in the installed position in the operating fluid reservoir;
the adapter fastened on the inner face of the operating fluid reservoir wall of the operating fluid reservoir; and
the valve housing fastened on the adapter such that the adapter is arranged between the operating fluid reservoir wall and the valve housing.

3. The valve system as claimed in claim 1, wherein:
the valve housing is configured to be fastened on the adapter by each one of the plurality of the second fastening devices being fastened with a corresponding one of the plurality of the first fastening devices to provide a plurality of fastening connections.

4. The valve system as claimed in claim 1, wherein:
the plurality of the first fastening devices are not longitudinally spaced apart from each other along the longitudinal axis of the adapter; and
the plurality of the second fastening devices are not longitudinally spaced apart from each other along the longitudinal axis of the adapter.

5. The valve system as claimed in claim 1, wherein:
the plurality of the first fastening devices are spaced apart from each other angularly around the longitudinal axis of the adapter such that the plurality of the first fastening devices are on opposing sides of the adapter; and
the plurality of the second fastening devices are spaced apart from each other angularly around the longitudinal axis of the valve housing such that the plurality of the second fastening devices are on opposing sides of the valve housing.

6. The valve system as claimed in claim 1, wherein:
the adapter is configured to be fastened on the inner face of the operating fluid reservoir wall of the operating fluid reservoir without extending through the operating fluid reservoir wall of the operating fluid reservoir.

7. The valve system as claimed in claim 1, wherein:
the latching opening comprises a through-hole formed in a wall of the adapter.

8. The valve system as claimed in claim 1, wherein:
a mounting end of the adapter is configured to be fastened on the inner face of the operating fluid reservoir wall of the operating fluid reservoir;
the plurality of the first fastening devices are disposed on a side wall of the adapter;
the plurality of the second fastening devices are disposed on a side wall of the valve housing;
wherein, when the valve housing is fastened on the adapter, the adapter side wall has a terminal end which faces towards the valve housing, and the at least one latching device is disposed on the adapter side wall remote from the terminal end of the adapter side wall which faces towards the valve housing; and
wherein, when the valve housing is fastened on the adapter, the valve housing side wall has a terminal end which faces towards the mounting end of the adapter, and the at least one latching opening is disposed on the valve housing side wall remote from the terminal end of the valve housing side wall which faces towards the mounting end of the adapter.

9. The valve system as claimed in claim 1, wherein:
the valve body is configured to be subjected to the lift from the operating fluid in a lift direction;
the plurality of the first fastening devices are disposed on a side wall of the adapter;
the plurality of the second fastening devices are disposed on a side wall of the valve housing; and
wherein the adapter side wall and the valve housing side wall are parallel with one another in the lift direction of the valve body, and the at least one latching device and the at least one latching opening are disposed on the adapter and valve housing side walls which are parallel, respectively.

10. A valve system, comprising:
a valve configured to operate as at least one of a venting valve and an air admission valve;
the valve including a hollow valve housing, which is configured to be located in an interior of an operating fluid reservoir;
the valve housing including at least one communication opening for fluid exchange between a valve housing interior and the interior of the operating fluid reservoir;
the valve housing including a ventilation opening for gas exchange between the valve housing interior and a ventilation line;
the valve including a valve body arranged in the valve housing interior;
in an installed position of the valve in the operating fluid reservoir, the valve body is configured to be at a distance from the ventilation opening when an operating fluid level within the interior of the operating fluid reservoir is below a shutoff level, such that the valve housing interior and the ventilation line are in fluid communication;
in the installed position of the valve in the operating fluid reservoir, the valve body is configured to be subjected to a lift from the operating fluid in the valve housing interior such that the valve body closes the ventilation opening when the operating fluid level within the interior of the operating fluid reservoir is above the shutoff level, such that the valve housing interior and the ventilation line are not in fluid communication;
a first adapter and a separate second adapter, which are each configured to be individually fastened on an inner face of an operating fluid reservoir wall of the operating fluid reservoir between the operating fluid reservoir wall and the valve housing, the first adapter and the second adapter each providing only a single installment position for the valve housing, the single installment position of the first adapter being a first installment position for the valve housing and the single installment position of the second adapter being a second installment position for the valve housing different from the first installment position;
the valve housing configured to be fastened on each one of the first adapter to the exclusion of the second adaptor or the second adapter to the exclusion of the first adaptor;
the valve housing is configured to be fastened on the first adapter at the first installation position;
the valve housing is configured to be fastened on the second adapter at the second installation position different from the first installation position; and
when the valve housing is fastened on the first adapter, the communication opening projects further into the operating fluid reservoir than when the valve housing is fastened on the second adapter, such that the shutoff level with the first adapter is different than the shutoff level with the second adapter.

11. The valve system as claimed in claim 10, wherein:
the first adapter and the second adapter each include a first fastening device;
the valve housing includes a second fastening device; and
the valve housing is configured to be fastened on each one of the first adapter or the second adapter by the second fastening device and the first fastening device.

12. The valve system as claimed in claim 11, wherein:
the first fastening device includes a latching device and the second fastening device includes a latching opening.

13. The valve system as claimed in claim 10, wherein:
the first adapter and the second adapter are each configured to be at least one of connected positively and materially to the operating fluid reservoir wall.

14. The valve system as claimed in claim 10, further comprising:
the operating fluid reservoir with the operating fluid reservoir wall;
the valve housing located in the interior of the operating fluid reservoir;
the valve in the installed position in the operating fluid reservoir;
the first adapter or the second adapter fastened on the inner face of the operating fluid reservoir wall of the operating fluid reservoir; and
the valve housing fastened on the first adapter or the second adapter such that the first adapter or the second adapter is arranged between the operating fluid reservoir wall and the valve housing.

15. A valve system, comprising:
a valve configured to operate as at least one of a venting valve and an air admission valve;
the valve including a hollow valve housing, which is configured to be located in an interior of an operating fluid reservoir;
the valve housing including at least one communication opening for fluid exchange between a valve housing interior and the interior of the operating fluid reservoir;
the valve housing including a ventilation opening for gas exchange between the valve housing interior and a ventilation line;
the valve including a single valve body arranged in the valve housing interior, whereby the valve only has one valve body;
in an installed position of the valve in the operating fluid reservoir, the valve body is configured to be at a distance from the ventilation opening when an operating fluid level of operating fluid within the interior of the operating fluid reservoir is below a shutoff level, such that the valve housing interior and the ventilation line are in fluid communication;
in the installed position of the valve in the operating fluid reservoir, the valve body is configured to be subjected to a lift from the operating fluid in the valve housing interior such that the valve body closes the ventilation opening when the operating fluid level within the interior of the operating fluid reservoir is above the shutoff level, such that the valve housing interior and the ventilation line are not in fluid communication;
the valve comprises an adapter, which is configured to be fastened on an inner face of an operating fluid reservoir wall of the operating fluid reservoir, wherein the inner face faces the interior of the operating fluid reservoir to contain the operating fluid and is disposed opposite an outer face of the tank;
the valve housing configured to be fastened on the adapter such that the adapter is arranged between the operating fluid reservoir wall and the valve housing;
the adapter comprises a plurality of first fastening devices, wherein the plurality of the first fastening devices are spaced apart from each other angularly around a longitudinal axis of the adapter;
the valve housing comprises a plurality of second fastening devices, wherein the plurality of the second fastening devices are spaced apart from each other angularly around a longitudinal axis of the valve housing;
the valve housing configured to be fastened on the adapter by each one of the plurality of the second fastening devices and each one of the plurality of the first fastening devices;
the plurality of the first fastening devices are not longitudinally spaced apart from each other along the longitudinal axis of the adapter;
the plurality of the second fastening devices are not longitudinally spaced apart from each other along the longitudinal axis of the adapter;
at least one of the plurality of first fastening devices includes a latching device and at least one of the plurality of second fastening devices includes a latching opening;
the adapter is configured to be connected at least one of positively and materially to the operating fluid reservoir wall; and
wherein, during the valve housing being fastened on the adapter, the latching device of the adapter forces the side wall of the valve housing to move until the latching device latches into the latching opening of the valve housing.

16. The valve system as claimed in claim 15, further comprising:
the operating fluid reservoir with the operating fluid reservoir wall;
the valve housing located in the interior of the operating fluid reservoir;
a vent line located in the interior of the operating fluid reservoir;
the vent line in fluid communication with the valve via the ventilation opening;
the valve in the installed position in the operating fluid reservoir;
the adapter fastened on the inner face of the operating fluid reservoir wall of the operating fluid reservoir; and
the valve housing fastened on the adapter such that the adapter is arranged between the operating fluid reservoir wall and the valve housing.

17. The valve system as claimed in claim 15, wherein:
the valve housing is configured to be fastened on the adapter by each one of the plurality of the second fastening devices being fastened with a corresponding one of the plurality of the first fastening devices to provide a plurality of fastening connections.

18. The valve system as claimed in claim 15, wherein:
the plurality of the first fastening devices are spaced apart from each other angularly around the longitudinal axis of the adapter such that the plurality of the first fastening devices are on opposing sides of the adapter; and
the plurality of the second fastening devices are spaced apart from each other angularly around the longitudinal axis of the valve housing such that the plurality of the second fastening devices are on opposing sides of the valve housing.

19. The valve system as claimed in claim 15, wherein:
the adapter is configured to be fastened on the inner face of the operating fluid reservoir wall of the operating fluid reservoir without extending through the operating fluid reservoir wall of the operating fluid reservoir.

20. The valve system as claimed in claim 15, wherein:
the latching opening comprises a through-hole formed in a wall of the adapter.

* * * * *